A. HIATT.
CATTLE TIE.
APPLICATION FILED MAR. 12, 1910.
1,129,093.
Patented Feb. 23, 1915.
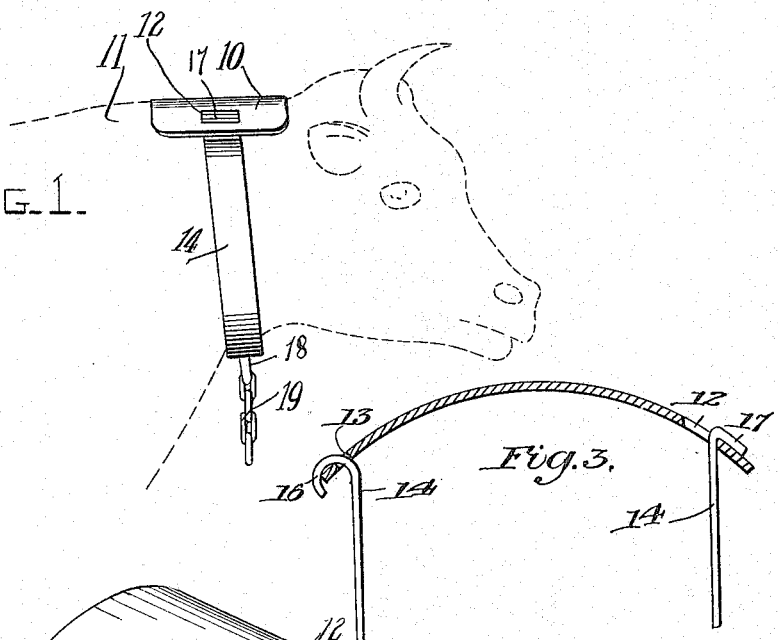
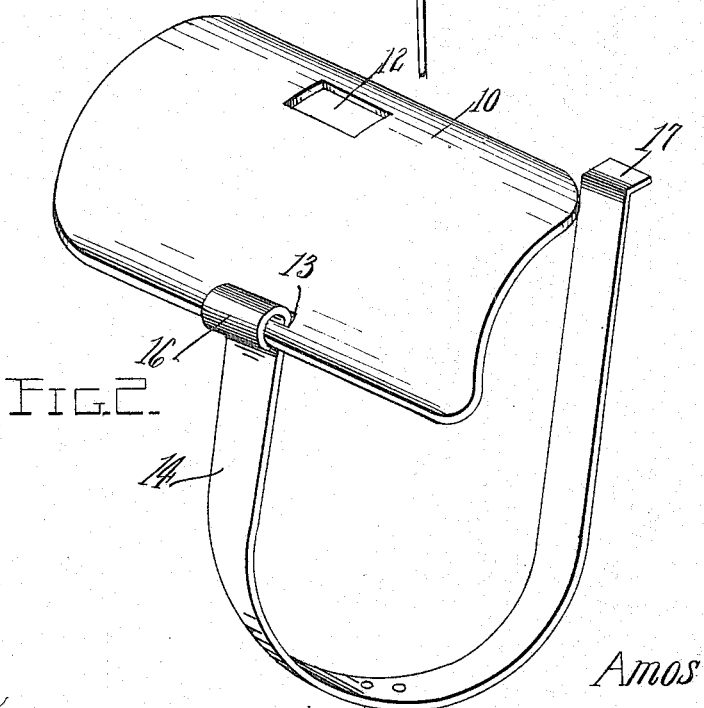

UNITED STATES PATENT OFFICE.

AMOS HIATT, OF ACKWORTH, NORTH DAKOTA.

CATTLE-TIE.

1,129,093.  Specification of Letters Patent.  Patented Feb. 23, 1915.

Application filed March 12, 1910. Serial No. 548,788.

*To all whom it may concern:*

Be it known that I, AMOS HIATT, a citizen of the United States, residing at Ackworth, in the county of Rolette, State of North Dakota, have invented certain new and useful Improvements in Cattle-Ties; and I do hereby declare the following to be a full, clear, and exact description of the invention, such as will enable others skilled in the art to which it appertains to make and use the same.

This invention relates to ties for securing animals, more particularly to devices of this character employed for securing cattle in their stalls or stables, and has for one of its objects to simplify and improve the construction and increase the efficiency and utility of devices of this character.

Another object of the invention is to provide a device of this character which effectually secures the animal without injury thereto, and which may be quickly attached to and detached from the animal.

With these and other objects in view, the invention consists in certain novel features of construction as hereinafter shown and described and then specifically pointed out in the claim; and, in the drawings illustrative of the preferred embodiment of the invention, Figure 1 is a side view of the improved device applied, Fig. 2 is an enlarged perspective view of the improved device in open or detached position. Fig. 3 is a transverse sectional view taken through the plate and the upper portions of the neck band, and showing the manner of fastening the band to the plate.

The improved device comprises a plate 10, preferably of sheet metal and oval in outline and curved transversely to correspond substantially to the upper side of the neck portion 11 of the animal. When the improved device is employed upon a cow or similar animal, the plate 10 corresponds to the upper side of the neck rearwardly of the horns and ears, as shown in Fig. 1. The plate 10 is provided with slots 12—13 at opposite sides, the slot 12 being wider than the slot 13, as shown in Fig. 2. The slot 13 is relatively long and narrow and in parallel relations to the adjacent edge of the plate.

Swingingly coupled to the frame 10 is a U-shaped band member, represented as a whole at 14, and provided with a loop 16 passing through the aperture 13, whereby the member 14 is swingingly coupled to the plate 10. The member 10 is bent into elongated U-shape as shown in Fig. 2, and formed with a lateral offset 17 at its free end, the offset being adapted to be passed through the relatively large aperture 12 and to engage against the upper face of the plate 10 externally of the aperture 12, and thus lock the member 14 to the plate 10. The member 14 is formed of resilient metal, preferably steel, and of sufficient strength to be retained in coupled relations to the plate 10 when the offset 17 is inserted through the aperture 12. The band 14 being relatively wide and the slot 13 being relatively long, the bearing 16 of the band is correspondingly long and produces a relatively long bearing, so that the band is prevented effectually from lateral movement to cause the terminal 17 to accurately pass through the opening 12 when the band is closed. Thus there is no danger of the terminal 17 missing the aperture 13 when actuated. This is an important feature of applicant's device and adds materially to its efficiency and utility. The member 14 is of sufficient length to pass around the neck of the animal and be coupled thereto by passing the terminal 17 through the aperture 12 from beneath, and retained in position by the resiliency of the band member. Connected to the bight portion of the member 14 is a loop 18 to receive the hitching strap or chain 19, as shown.

Referring to Fig. 3 of the drawings it will be seen that that portion of the member 10 lying outside of the aperture 12 and here designated as 12' extends outwardly to form a guard for the loop member 14. Should the animal rub against a wall or post the portion 12' will be the only part of the tie which will contact therewith, the bent portion 17 lying inside of the vertical plane passing through the extremity of the portion 12' cannot be detached accidentally.

The relatively large plate 10 provides a correspondingly large area for bearing against the neck of the animal, and thus prevents any abrasion of the neck or other injury thereto when in use.

It will be apparent from an inspection of the drawing that the forward end of the plate 10 engages the back of the animal's head to which it is applied and the opposite end of the plate rests upon the shoulders. This arrangement makes it impossible for the animal to move his head to a sufficient degree to endanger a person standing nearby.

The improved device is simple in construction, can be inexpensively manufactured and provides an effectual hitching means for the animal, which may be quickly connected and disconnected. The device being entirely of metal, is strong and durable, and is not liable to become detached no matter how vigorously the animal may throw its head about from place to place.

From the foregoing it will be apparent that when the device is positioned upon the neck of an animal the bearing plate will be held in such position as to prevent any undesired movement of the neck and head which is often desired when animals are being transported.

What is claimed is:—

In a cattle tie, the combination with a rigid, elongated outwardly bowed plate adapted to fit upon the back of the animal's neck, said plate having parallel side edges, a concave forward edge adapted to lie at the base of the animal's head, and a convex rear edge adapted to bear at the base of the animal's neck and means for securing the plate in position upon the neck of the animal.

In testimony whereof, I affix my signature, in presence of two witnesses.

AMOS HIATT.

Witnesses:
GEORGE HIATT,
C. I. F. WAGNER.

Copies of this patent may be obtained for five cents each, by addressing the "Commissioner of Patents, Washington, D. C."